United States Patent [19]

Rogers

[11] 3,959,350
[45] May 25, 1976

[54] MELT-FUSIBLE LINEAR POLYIMIDE OF 2,2-BIS(3,4-DICARBOXYPHENYL)-HEXA-FLUOROPROPANE DIANHYDRIDE

[75] Inventor: Francis Elliot Rogers, Dayton, Ohio

[73] Assignee: E. I. Du Pont de Nemours and Company, Wilmington, Del.

[22] Filed: May 17, 1971

[21] Appl. No.: 144,339

[52] U.S. Cl............... 260/47 C; 260/30.2; 260/30.8 R; 260/32.6 N; 260/78 TF
[51] Int. Cl.².................................. C08G 73/10
[58] Field of Search............... 260/78 TF, 47 CP

[56] References Cited
UNITED STATES PATENTS

| | | | |
|---|---|---|---|
| 2,324,181 | 2/1966 | Olivier | 260/47 |
| 3,179,634 | 4/1965 | Edwards | 260/78 TF |
| 3,356,648 | 12/1967 | Rogers | 260/47 |
| 3,424,718 | 1/1969 | Angelo | 260/47 |
| 3,649,601 | 4/1972 | Critchley | 260/78 TF |

*Primary Examiner*—Lester L. Lee

[57] ABSTRACT

Linear polyimides are provided of the following recurring structural unit:

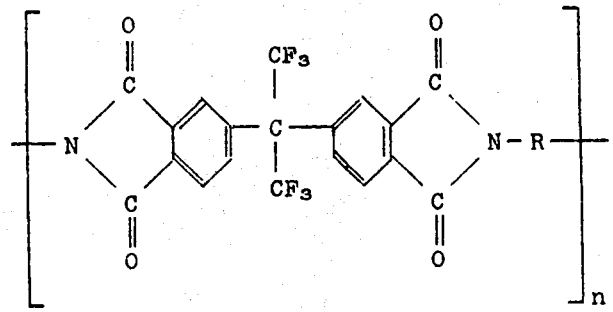

wherein R is

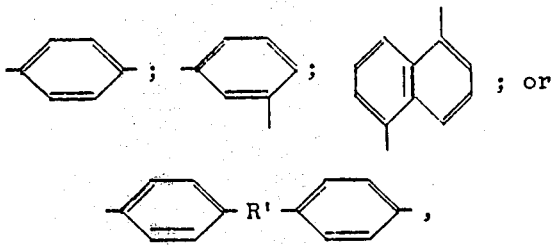

and R' is —O—, —S—, and —O—R''—O— and R'' is phenylene.

5 Claims, No Drawings

MELT-FUSIBLE LINEAR POLYIMIDE OF 2,2-BIS(3,4-DICARBOXYPHENYL)-HEXA-FLUOROPROPANE DIANHYDRIDE

THE INVENTION

The present invention relates to novel polymeric materials. More particularly, the present invention is directed to melt-fusible aromatic linear polyimides and shaped structures thereof.

Polyimides are known polymeric materials and are described in, for example, U.S. Pat. Nos. 3,179,631, 3,179,634 and 3,356,648. Also, certain melt-fabricable polyimides are described in U.S. Pat. No. 3,234,181. As described in the aforementioned patents, the polyimides are obtained by reacting specified tetracarboxylic acid dianhydrides with specified diprimary diamines to obtain intermediate polyamide-acids which are converted by any suitable means such as chemical or heat treatment to the corresponding polyimide. The polyimides so obtained are generally intractable materials; however U.S. Pat. No. 3,234,181 discloses that melt-fabricable polyimides may be obtained from certain specific tetracarboxylic acid dianhydrides and specific primary diamines. There is no disclosure in the prior art of melt-fusible polyimides of the present invention derived from 2,2-bis(3,4-dicarboxyphenyl) hexafluoropropane dianhydride that are characterized by a glass transition temperature of between about 220°C. and about 385°C. Such polyimides are characterized by wholly surprising and unexpected properties such as, for example, melt processibility and, when end-capped with phthalic anhydride, they have outstanding melt viscosity stability. Accordingly, it is the principal object of the present invention to provide specific polyimide polymeric material having unique and unexpected properties.

According to the present invention, there is provided a novel linear polyimide polymeric material having the following recurring structural unit:

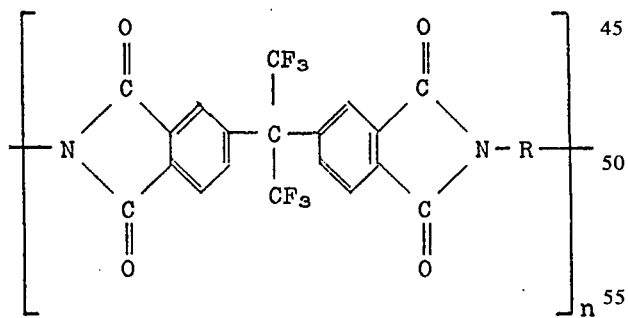

wherein R is selected from the group consisting of wherein R' is a divalent bridging radical selected from the group of —O—, —S—, and —O—R''—O— wherein R'' is a divalent aromatic radical such as phenylene and n is a number sufficient to provide a polymer having an inherent viscosity of at least about 0.15, and preferably at least about 0.30, measured as a solution of the polymer in sulfuric acid of 30°C., said polyimide having a glass transition temperature of between about 220°C. and about 385°C. In a preferred embodiment for extrusion and injection molding, the polyimide of the present invention is characterized by amine end groups that are end-capped with phthalic anhydride.

Polyimides of the present invention having a maximum glass transition temperature of 311°C. and a melt viscosity of less than about $5.5 \times 10^5$ poises may be molded into any desired shape, e.g., combs, gears, etc., by conventional melt injection techniques. Additionally, the polyimides of the present invention may be utilized for preparing self-supporting film structures and composite structures having outstanding physical properties.

The nature and advantages of the polyimide polymer of the present invention will be more clearly understood from the following description thereof.

The polyimide of the present invention is obtained by reacting 2,2-bis(3,4-dicarboxyphenyl)hexafluoropropane dianhydride of the formula:

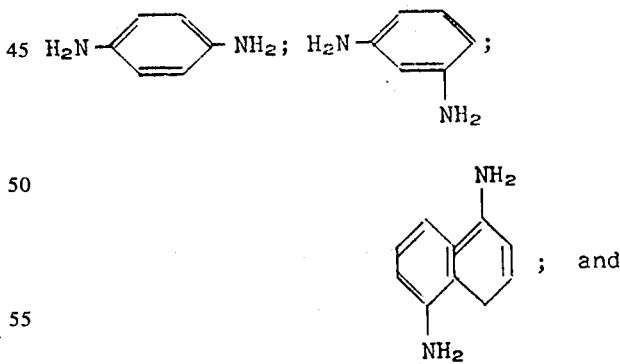

with at least one aromatic primary diamine having the formula:

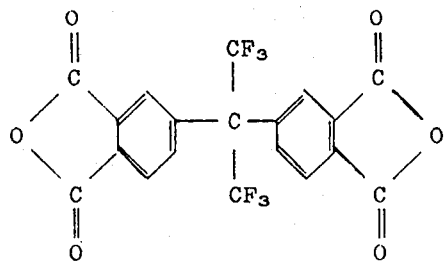

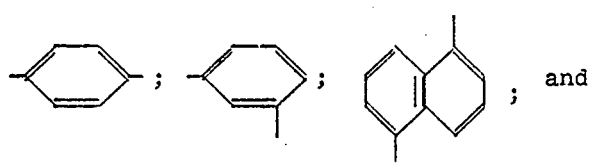

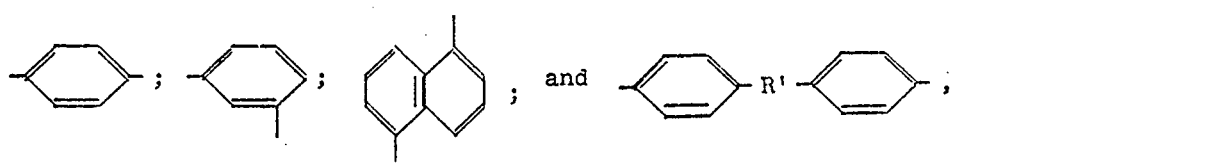

wherein R' is a divalent bridging group selected from the group of —O—, —S—, and —O—R''—O— wherein R'' is phenylene, in a suitable solvent at a temperature below about 75°C. thereby to obtain an intermediate polyamide acid. Thereafter, an end-capping agent is preferably added to the reaction system in order to cap the ends of the polymeric chain, and next the polyamide acid is converted to the corresponding polyimide by a conversion treatment which, for example, may consist of adding a chemical converting agent such as acetic anhydride to the reaction system which cyclizes the polyamide acid to form imide linkages characteristic of the polyimide of the present invention.

The 2,2-bis(3,4-dicarboxyphenyl)hexafluoropropane dianhydride utilized in the process described above may be prepared in the manner described in U.S. Pat. No. 3,310,573.

Suitable aromatic primary diamines of the above formula include:
 4,4'-diamino-diphenyl ether, (ODA);
 4,4'-diamino-diphenyl sulfide, (TDA);
 1,3-bis[4-aminophenoxy]benzene, (RBA);
 1,4-bis[4-aminophenoxy]benzene,
and any of the aforementioned diamines in combination with each other or in combination with meta-phenylene diamine; para-phenylene diamine; 1,5-diaminonaphthalene. The diamines may be prepared in a manner known per se.

The most desirable procedure for reacting the 2,2-bis(3,4-dicarboxyphenyl)hexafluoropropane dianhydride with the diamine or mixture of diamines includes adding dry solid dianhydride to a pyridine solution of the diamine reactant. Any suitable solvent for the reactants may be used, and satisfactory results have been obtained with pyridine. An important feature of the process is that the pyridine must be dry since any moisture present therein lowers the molecular weight of and decreases the stability of the polymeric product. The solvent may conveniently be dried by passing it through molecular sieves in a manner known per se. The temperature of the reaction solution is maintained below about 75°C. during the addition of the dianhydride. The dianhydride and the diamine may be reacted in equimolar amounts and it has been found that a slight excess of the diamine up to about 5.5%, on a molar basis, is necessary in order to obtain a polyimide having an inherent viscosity of at least about 0.30, measured in sulfuric acid as herein defined.

A salient feature of the invention rests upon the discovery that it is essential and crictical to end-cap the excess diamine end groups with an aromatic anhydride such as, for example, phthalic anhydride, in order to obtain satisfactory melt viscosity stability for injection molding and extrusion. The melt-fusible polyimide suitable for injection molding and extrusion is characterized by a glass transition of between about 220°C. and 311°C. and a melt flow of at least about 0.2 gram/minute after a melt-index hold-up of 40 minutes at 420°C. A stoichiometric amount of phthalic anhydride end-capping agent is utilized. It has been found that omitting the phthalic anhydride end-capping results in a polymer having unacceptable melt viscosity stability for injection molding and extrusion uses.

Following addition of the end-capping agent, the polyamide-acid is converted to the corresponding polyimide by adding acetic anhydride. The acetic anhydride dehydrating agent may be used in amounts of between about 2 and about 8 moles per mole of polyimide polymer produced. The resulting polyimide precipitates upon addition to a stirred miscible non-solvent such as, for example, methanol, and may be recovered by known means such as filtration and, preferably, the polyimide is thereafter washed and dried.

Another salient feature of the invention is the discovery that the polyimides derived from 2,2-bis(3,4-dicarboxyphenyl) hexafluoropropane dianhydride are melt-fusible and may be injection molded when dried to a water content below about 0.02% by weight, based upon the total polyimide weight, to provide useful articles having high temperatures resistance properties. For example, rectangular shaped objects and coil forms may be injection molded on a 1½ ounce screw type injection molding machine (Arburg) by maintaining a rear barrel temperature of 400°C., a center barrel temperature of 405°C. and a front barrel temperature of 410°C. while operating at a machine screw speed of 80 rpm and a mold temperature of about 220°C.

The principle and practice of the invention will now be illustrated by the following Examples which are only exemplary thereof and it is not intended that the invention be limited thereto since modifications in technique and operation will be apparent to anyone skilled in the art. All parts and percentages expressed in the following Examples are by weight unless otherwise indicated.

The polymers and shaped structures thereof prepared in the following Examples were evaluated in accordance with the following procedures:

INHERENT VISCOSITY

The inherent viscosity of the polymer samples was obtained by measuring the viscosity of both the polymer solution and the solvent, and inherent viscosity was calculated from the following equation:

$$\text{Inherent Viscosity} = \frac{\text{Natural Logarithm}\left(\frac{\text{Viscosity of Polymer Solution}}{\text{Viscosity of Solvent}}\right)}{C}$$

where C is the concentration expressed in grams of polymer per 100 milliliters of solution. The polymer solution was obtained by dissolving 0.5 gram of the polymer in an initial amount of solvent less than 100 mls. at 30°C., and then adjusting the total solution to 100 mls. by adding additional solvent at 30°C. The solvents used were either pyridine, sulfuric acid or dimethylacetamide, as indicated with the reported values of inherent viscosity herein. As is known in the polymer art, inherent viscosity is related to the molecular weight of the polymer.

GLASS TRANSITION TEMPERATURE, Tg

The glass transition temperature of the polymer samples was obtained by either differential scanning calorimetry or differential thermal analysis techniques at 30°C./min. using a Du Pont Model 900 DTA Analyzer. The glass transition temperature was defined as the point of interception of the intersecting tangent lines at the point of first inflection of the heating curve of the polymer.

MELT VISCOSITY

The melt viscosity of the polyimide polymer was measured in a melt indexer of the type described in ASTM-D-1238-52T, modified for corrosion resistance to embody a cylinder and orifice of "Stellite" alloy. The polymer is charged to the 0.375 inch I.D. cylinder which is held at 390°C. ± 0.5°C., unless otherwise specified, allowed to come to equilibrium temperature for 5 minutes, and extruded through the 0.0825 inch diameter, 0.315 inch long orifice under a piston loading of 15 kilograms. The specific melt viscosity in poises is calculated as $10^5$ divided by the observed extrusion rate in grams per minute.

EXAMPLE 1

0.4442 gram (0.001 mole) of 2,2-bis(3,4-dicarboxyphenyl)hexafluoropropane dianhydride and 0.2002 gram (0.001 mole) of 4,4'-diaminodiphenyl ether were added at room temperature to a reaction flask containing a nitrogen atmosphere and 4 ml. of dimethylacetamide. After stirring for 30 minutes an additional amount of 2.8 ml. of dimethylacetamide was added to the reaction flask. The contents of the reaction flask were stirred an additional 1 hour and the intermediate polyamide-acid that was obtained had an inherent viscosity of 1.164, as measured in dimethylacetamide at 30°C. The intermediate polyamide-acid was converted to the corresponding polyimide by adding 0.1 ml. of beta-picolene and 0.75 ml. of acetic anhydride to the reaction flask.

The polyimide solution was cast onto a plate and spread by passing a knife blade repeatedly thereover. The wet film was heated with an infrared lamp until cohesive and then the plate and film was placed in a heated oven at 140°C. The film was cured until it was strong enough to be stretched over a frame. The stretched film was further heated at 140°C. for 1½ hours. The film was next further heat-treated at 300°C. for 1 hour. The resulting polyimide film was tough, clear and slightly yellow in color.

EXAMPLE 2

To a 3 liter 3-neck round bottom flask equipped with a thermometer, mechanical stirrer, condenser and nitrogen purge was added 100.06 g. (0.5003 mole, 4% excess) 4,4'-diaminodiphenyl ether (ODA). The diamine was washed with 700 ml. of distilled pyridine which has been dried over molecular sieves just prior to use. The mixture was stirred and heated to 50°–60°C. to effect solution of the diamine. 213.6 g. (0.4811 mole) of 2,2-bis(3,4-dicarboxyphenyl)hexafluoropropane dianhydride (hereinafter called 6F) was then added as a dry solid in small portions over about five minutes with stirring. Last traces were washed in with 100 ml. dry pyridine. The temperature was maintained at 50°–60°C. At the end of 45 minutes all of the dianhydride was in solution an 5.6962 g. (0.03849 mole) phthalic anhydride capping agent was added all at once and washed in with 100 ml. dry pyridine. At this point the temperature of the solution was 40-50° C. After stirring for 45 minutes all of the phthalic anhydride was in solution and 313 ml. of acetic anhydride was added slowly through the top of the condenser. The temperature of the reaction mixture rose from 39°C. to 55°C. Imidization occurred essentially instantaneously. After stirring for at least 30 minutes the solution of 6F/ODA was cooled to room temperature and poured with vigorous stirring into a Waring blender partly filled with a non-solvent, e.g., methanol. The granular polymer which came out of solution was separated by filtration, washed with about 500 ml. methanol, and dried overnight in a vacuum oven at 120°–170°C. It was finally dried for at least 2 hours at 260°C. to remove last traces of water and solvents. The product was characterized by having an inherent viscosity of 0.42, as measured in sulfuric acid at 30°C. The physical properties of the polyimide are shown in Table 1 below.

EXAMPLE 3–6

The procedure of Example 2 above was repeated using the following listed diamines in place of the ODA of Example 2:
  a. 4,4'-diamino-diphenyl sulfide, (TDA)
  b. 1,3-bis[4-aminophenoxy]benzene, (RBA)
  c. a mixture of 60% ODA* and 40% RBA
  d. a mixture of 65% ODA* and 35% 1,5-ND*

*is 4,4'-diamino-diphenyl ether
**1,5-ND is 1,5-diamino-naphthalene

The properties of the resulting polyimides also are shown in Table 1 below.

EXAMPLES 7–8

For comparative purposes, the procedure of Example 2 was repeated using the following listed dianhydrides in place of the 6F dianhydride of Example 2:
  a. 2,2-bis(3,4-dicarboxyphenyl) sulfone dianhydride, (CSDA);
  b. benzophenonetetracarboxylic dianhydride, (BTDA)

The properties of the resulting polyimides also are shown in Table 1 below. As can be seen from Table 1, the polyimides from CSDA and BTDA are highly intractable and do not exhibit melt flow properties.

TABLE 1

| EXAMPLE | DIANHYDRIDE | DIAMINE | MOLE % EXCESS DIAMINE | INHERENT VISCOSITY PYRIDINE | INHERENT VISCOSITY $H_2SO_4$ | MELT FLOW g/min. 390°C. – 420°C. | Tg, °C |
|---|---|---|---|---|---|---|---|
| 2 | 6F | ODA | 4.00 | | 0.42 | 0.23 | — |
| 3 | 6F | TDA | 4.00 | 0.35 | | 0.40 | 283 |
| 4 | 6F | RBA | 5.00 | 0.35 | | 11.3 | 229 |
| 5 | 6F | ODA/RBA 60/40 | 4.50 | 0.39 | | 1.4 | 259 |
| 6 | 6F | ODA/1,5-ND 65/35 | 4.50 | 0.35 | | 0.23 | 311 |
| 7 | CSDA | ODA | 4.25 | Insoluble | | No flow | — |
| 8 | BTDA | ODA | 4.50 | Insoluble | | No flow | — |

What is claimed is:

1. A melt-fusible linear polyimide polymeric material having the following recurring structural unit:

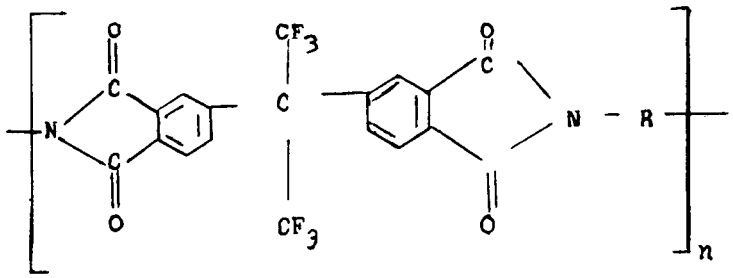

wherein R is selected from aromatic groups of the group consisting of

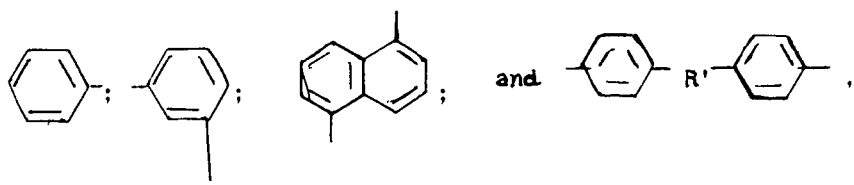

wherein R' is a divalent bridging radical selected from the group of —O—, —S—, and —O—R"—O— wherein R" is phenylene, and n is a number sufficient to provide a polymer having an inherent viscosity of at least about 0.15 measured as a solution of the polymer in sulfuric acid at 30°C., said polyimide having a glass transition temperature of between about 220°C. and about 385°C.

2. The melt-fusible polyimide of claim 1 end-capped with end groups prepared from phthalic anhydride.

3. A shaped structure of the linear polyimide of claim 1.

4. The structure of claim 3 which comprises a tough film structure.

5. A polyaide-acid polymeric material prepared by reacting a 2,2-bis(3,4-dicarboxyphenyl) hexafluoropropane dianhydride of the formula:

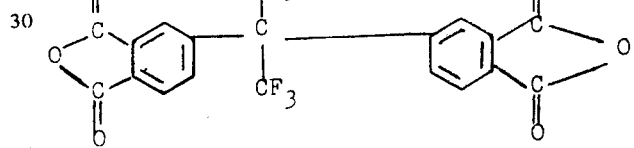

and at least one aromatic primary diamine having the formula:

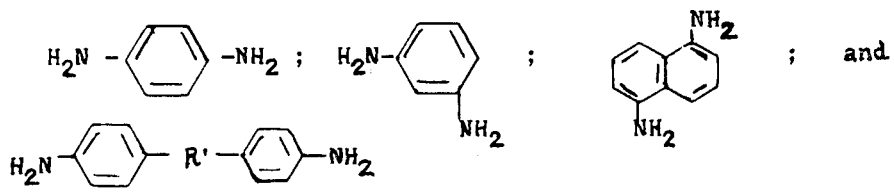

wherein R' is a divalent bridging group selected from the group of —O—, —S—, and —O—R"—O— wherein R" is phenylene.

* * * * *